United States Patent Office 3,108,103
Patented Oct. 22, 1963

3,108,103
4,5-DIHALOGENPYRIDAZONES-(6)
Hans Ruprecht Hensel, Heidelberg, Hans Baumann, Ludwigshafen (Rhine), Arnold Tartter, Lambsheim, Pfalz, and Hermann Weissauer, Ludwigshafen (Rhine), Germany, assignors to Badische Anilin- & Soda-Fabrik Aktiengesellschaft, Ludwigshafen (Rhine), Germany
No Drawing. Filed May 2, 1962, Ser. No. 191,740
Claims priority, application Germany Jan. 29, 1960
3 Claims. (Cl. 260—250)

This invention relates to 4,5-dihalogenpyridazones-(6) which are substituted in 1-position by an aliphatic radical.

It is an object of the invention to provide 4,5-dihalogenpyridazones which can be reacted with dyestuffs in order to form reactive dyes which contain a 4,5-dihalogenpyridazone radical attached by way of an aliphatic group.

It is a further object of the invention to provide a method for the production of the 4,5-dihalogenpyridazones.

According to a prior art method 4,5-dichlorpyridazone-(6) is obtained by heating mucochloric acid semicarbazone in anhydrous acetic acid at 100° C. to 110° C. for a long period of time and precipitating the reaction product by adding water. According to another prior method 1-phenyl-4,5-dihalogenpyridazones-(6) can be prepared by boiling mucohalic acid phenyl hydrazones in anhydrous acetic acid or acetic anhydride. The mucohalic acid hydrazones are prepared from mucohalic acids and hydrazines, in general while using organic solvents.

These methods are relatively expensive for the industrial production of 4,5-dihalogenpyridazones-(6); moreover, they are unsuitable especially when water-soluble hydrazines are to be used as these are difficult to isolate from the aqueous reaction mixtures when prepared by reduction of diazonium salts.

In particular the invention relates to 4,5-dihalogenpyridazones-(6) of the formula:

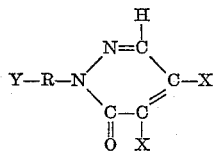

wherein X represents a chlorine or bromine atom, R represents an ethylene or propylene radical and Y represents an amino, cyano, carboxylic acid or carboxylic acid chloride group.

Further it relates to the production of 4,5-dihalogenpyridazones-(6) of the formula:

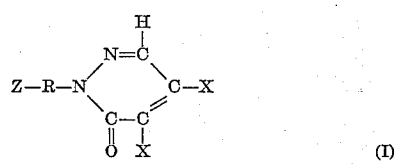

in which X represents a chlorine or bromine atom, R represents an ethylene or propylene radical and Z represents an amino, cyano or carboxylic acid group, by reacting mucochloric acid or mucobromic acid and dilute aqueous mineral acid solution at a pH of less than 3.5 and at a temperature between 70° and 100° C. with a hydrazine of the formula:

Z—R—NH—NH$_2$ wherein R and Z have the meanings as given above.

Preferred dilute aqueous mineral acids are hydrochloric acid and sulfuric acid, but other mineral acids, such as phosphoric acid, perchloric acid or nitric acid may also be used. The concentration of said dilute acids may vary within wide limits.

Mineral acids having a concentration of between 2 and 20% by weight are preferred, but a dilute acid having a concentration of less than 2% is also useful provided it has a pH of less than 3.5, i.e., is acid to Congo paper.

Examples of hydrazines to be reacted with mucochloric or mucobromic acid are cyanoethylhydrazine, aminoethylhydrazine, aminopropylhydrazine, hydrazinoacetic acid and hydrazinopropionic acid.

The yields of the 4,5-dihalogenpyridazones-(6) obtained in the aforesaid manner generally come very close to those calculated theoretically, even if water-soluble hydrazines are used as initial materials.

The halogenpyridazones containing a carboxylic acid group or a carboxylic acid chloride group are obtained, preferably by hydrolysis of the cyanoalkylpyridazones and subsequent conversion into the acid chloride respectively.

The halogenpyridazones-(6) according to the invention are valuably precursors of reactive dyestuffs. The reactive pyridazone radicals may be introduced into dyestuff molecules for example by reacting 2-(4,5-dichloropyridazon-6-yl-1)-propionic acid chloride with a dyestuff containing an acylatable amino group or by reacting 1 - beta - aminoethyl - 4,5 - dichloropyridazone - (6) - hydrochloride with a dyestuff containing an atom or a group which may be replaced by an amino group. This will be illustrated more specifically in the examples.

The parts specified in the examples are parts by weight unless otherwise indicated. The parts by volume bear the same relation to the parts by weight as does the liter to the kilogram.

*Example 1*

53 parts of acrylonitrile are run into a solution of 50 parts of hydrazine hydrate in 50 parts of water while stirring, the temperature being maintained at 25° to 30° C. by cooling. Stirring is continued at this temperature for one hour and then the reaction solution which contains 2-hydrazinopropionitrile is combined with 20 parts of concentrated hydrochloric acid and 170 parts of mucochloric acid, the temperature rising to 70° C. The mixture is then heated to 95° C. for 30 minutes and allowed to cool while stirring vigorously until the reaction product which separates in an oily condition has solidified. The isolated 1-(2-cyanoethyl) - 4,5 - dichloropyridazone - (6) crystallizes from aqueous ethanol as colorless crystals which melt at 100° C.

*Example 2*

85 parts of 2-hydrazinopropionitrile is stirred into a mixture of 1,500 parts of water, 100 parts of concentrated hydrochloric acid and 170 parts of mucochloric acid having a temperature of 70° C. The reaction mixture is heated at 90° C. for one hour and the reaction product which is isolated by cooling is entered, while still moist, into 400 parts of 70% sulfonic acid. The solution so obtained is then heated to 120° to 130° C., maintained at this temperature for one hour while stirring, then cooled down to 50° C. and combined with 600 parts of ice water. The carboxylic acid which precipitates is filtered off by suction, washed with ice water and dried. There are obtained 148 parts of 2-(4,5-dichloropyridazon-6-yl-1)-propionic acid with the melting point 124° to 125° C.

The acid chloride is obtained by heating 47.4 parts of said acid and 71.4 parts of thionyl chloride in 142 parts by volume of benzene for three hours at the boil. After removal of the solvent and excess thionyl chloride under reduced pressure the acid chloride is obtained as a syrupy residue.

By reacting 2-hydrazinopropionitrile with the equivalent amount of mucobromic acid instead of with mucochloric acid and otherwise following the procedure described above, β-(4,5-dibromopyridazonyl-1)-propionic acid is obtained, from which β-(4,5-dibromopyridazonyl-1)-propionyl chloride is prepared by reaction with thionyl chloride.

A benzene solution of 20 parts of β-(4,5-dichloropyridazonyl-1)-propionyl chloride is allowed to drip, in the course of one hour, at room temperature and while stirring vigorously, into an aqueous solution (which has been adjusted to a pH value of 6 to 7) of 22 parts of a dye obtained by coupling diazotized o-aminobenzene sulfonic acid with 1-hydroxy-8-acetaminonaphthalene-3,6-disulfonic acid and saponification in 5% caustic soda solution. Acylation is completed after 3 or 4 hours. After separation of the benzene layer, 45 parts of a bluish-red dye of the formula:

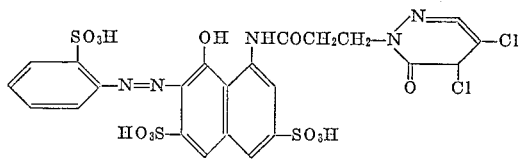

are obtained from the aqueous phase by salting out.

*Example 3*

A mixture of 20 parts of beta-aminoethylhydrazine, 45 parts of mucochloric acid and 300 parts of 8% hydrochloric acid is heated to 90° C. for two hours. By cooling there are obtained 32 parts of 1-beta-aminoethyl-4,5-dichloropyridazone-(6)-hydrochloride in the form of a colorless crystalline product with the melting point 264° to 266° C. ($C_6H_7ON_3Cl_2 \cdot HCl$ (244.5)).

Calc.: C, 29.46; H, 3.30; O, 6.54; N, 17.16; Cl, 43.5.
Found: C, 29.6; H, 3.4; O, 7.0; N, 17.3; Cl, 43.0.

A mixture of 12 parts of 1-(β-aminoethyl)-4,5-dichloropyridazone-(6) hydrochloride and 5 parts of anhydrous sodium acetate is added to a solution of 10 parts of 2,4-dinitrochlorobenzene in 200 parts of ethanol and the mixture is heated to boiling under reflux for 5 to 6 hours. After cooling the crude product is filtered off by suction, washed with water and dried. There are obtained 15 parts of a yellow dyestuff with the melting point 162° C., which dyes polyamides yellow shades in the presence of alkaline substances, the dyeings obtained being fast to washing.

This application is a continuation-in-part of our application Serial Number 84,524, filed January 24, 1961.

What we claim is:

1. A 4,5-dihalogenpyridazone-(6) of the formula:

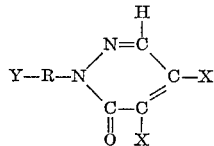

wherein X represents a member selected from the group consisting of chlorine and bromine, R represents a member selected from the class consisting of ethylene and propylene and Y represents a member selected from the group consisting of amino, cyano, carboxyl and chlorocarbonyl.

2. The compound of the formula:

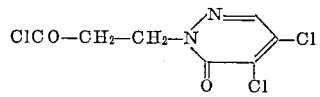

3. The compound of the formula:

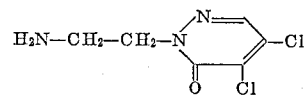

No references cited.